(12) United States Patent
Saquib et al.

(10) Patent No.: US 10,769,801 B2
(45) Date of Patent: *Sep. 8, 2020

(54) FAST MULTI-SPECTRAL IMAGE REGISTRATION BY MODELING PLATFORM MOTION

(71) Applicant: Goodrich Corporation, Charlotte, NC (US)

(72) Inventors: Suhail Shabbir Saquib, Shrewsbury, MA (US); Matthew D. Egan, Westford, MA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/210,091

(22) Filed: Dec. 5, 2018

(65) Prior Publication Data

US 2019/0114791 A1  Apr. 18, 2019

Related U.S. Application Data

(63) Continuation of application No. 15/482,212, filed on Apr. 7, 2017, now Pat. No. 10,360,688.

(Continued)

(51) Int. Cl.
*G06T 7/30* (2017.01)
*G06T 3/00* (2006.01)
(Continued)

(52) U.S. Cl.
CPC .............. *G06T 7/30* (2017.01); *G06T 3/0093* (2013.01); *G06T 3/40* (2013.01); *G06T 7/32* (2017.01);
(Continued)

(58) Field of Classification Search
CPC ....... G06T 7/0012; G06T 19/20; G06T 15/10; G06T 2207/10032
(Continued)

(56) References Cited

U.S. PATENT DOCUMENTS 6,367,933 B1 * 4/2002 Chen .................... H04N 3/2335
348/744
6,503,201 B1 * 1/2003 Liu ..................... G01S 7/52046
600/443

(Continued)

OTHER PUBLICATIONS

P.Nandy, et al., "Edge-Based Correlation Image Registration Algorithm for the Multispectral Thermal Imager (MTI)", Algorithms and Technologies for Multispectral, Hyperspectral, and Ultraspectral Imagery, Aug. 12, 2004, pp. 197-207 (11 pages).

(Continued)

*Primary Examiner* — Yosef Kassa
(74) *Attorney, Agent, or Firm* — Locke Lord LLP; Scott D. Wofsy; Joshua L. Jones

(57) ABSTRACT

A method of predicting warps for image registration includes receiving warp data for a first band pair in an N-band system. The method includes fitting a warp model to the warp data to produce an offset profile for the first band pair, predicting a respective offset profile for at least one other band pair in the N-band system, and using the predicted respective offset profile to generate a warp for the at least one other band pair. The method also includes registering images of the at least one other band pair using the warp for the at least one other band pair. In another aspect, a method of predicting warps for image registration includes receiving warp data for m band pairs in an N-band system, wherein m≤(N−1) and m>2, to register images.

3 Claims, 7 Drawing Sheets

Related U.S. Application Data

(60) Provisional application No. 62/321,008, filed on Apr. 11, 2016.

(51) Int. Cl.
*H04N 5/33* (2006.01)
*G06T 3/40* (2006.01)
*G06T 7/32* (2017.01)

(52) U.S. Cl.
CPC ... *H04N 5/332* (2013.01); *G06T 2207/10036* (2013.01)

(58) Field of Classification Search
USPC ....... 382/170, 171, 190, 260, 268, 275, 284, 382/294, 295; 358/1.2, 3.26, 3.37, 537
See application file for complete search history.

(56) References Cited

U.S. PATENT DOCUMENTS

| | | | | |
|---|---|---|---|---|
| 7,075,661 | B2* | 7/2006 | Petty | G01S 5/163 356/603 |
| 7,162,063 | B1* | 1/2007 | Craine | G06T 7/0012 128/922 |
| 7,478,091 | B2* | 1/2009 | Mojsilovic | G06F 19/321 |
| 7,643,684 | B2* | 1/2010 | Lee | G06K 9/00268 348/135 |
| 7,719,563 | B2* | 5/2010 | Richards | G06F 3/04815 348/36 |
| 8,098,958 | B2 | 1/2012 | Oldroyd | |
| 8,139,929 | B2* | 3/2012 | Oshima | G11B 20/10 386/337 |
| 8,194,952 | B2* | 6/2012 | Mertz | A61B 5/444 382/128 |
| 8,219,438 | B1* | 7/2012 | Moon | G06Q 30/0201 705/7.29 |
| 8,390,628 | B2* | 3/2013 | Harding | G06T 7/251 345/474 |
| 8,391,693 | B2* | 3/2013 | Oshima | G11B 20/10 386/355 |
| 8,446,468 | B1 | 5/2013 | Medioni et al. | |
| 8,463,078 | B2* | 6/2013 | Goodnough | H04N 5/37206 348/218.1 |
| 8,657,101 | B2* | 2/2014 | Zoni | B65G 29/00 198/459.2 |
| 9,463,078 | B2* | 10/2016 | Nourian | A61C 8/0089 |
| 2011/0164108 | A1 | 7/2011 | Bates et al. | |

OTHER PUBLICATIONS

Regis Perrier et al., "Satellite Image Registration for Attitude Estimation With a Constrained Polynomial Model", 2010 17th IEEE International Conference on Image Processing; Sep. 26-29, 2010; Sep. 26, 2010, pp. 925-938, (4 pages).

Regis Perrier et al., "Estimating Satellite Attitude from Pushbroom Sensors", 2010 IEEE Conference on Computer Vision and Patter Recognition, Jun. 13-18, 2010, Jun. 13, 2010, pp. 591-598 (8 pages).

Partial European Search Report dated Jul. 25, 2017 issued during the prosecution of corresponding European Patent Application No. EP 17162276.4 (12 pages).

Extended European Search Report dated Nov. 2, 2017 issued during the prosecution of European Patent Application No. EP 17162276.4 (9 pages).

* cited by examiner

//FAST MULTI-SPECTRAL IMAGE REGISTRATION BY MODELING PLATFORM MOTION

CROSS-REFERENCE TO RELATED APPLICATIONS

This application is a continuation of U.S. patent application Ser. No. 15/482,212 filed Apr. 7, 2017 entitled "FAST MULTI-SPECTRAL IMAGE REGISTRATION BY MODELING PLATFORM MOTION", which claims the benefit of U.S. Provisional Patent Application No. 62/321,008 filed Apr. 11, 2016, the contents of which are hereby incorporated by reference in their entirety.

STATEMENT REGARDING FEDERALLY SPONSORED RESEARCH OR DEVELOPMENT

This invention was made with government support under a Contract awarded by an agency. The government has certain rights in the invention.

BACKGROUND OF THE INVENTION

1. Field of the Invention

The present disclosure relates to imagery, and more particularly to registration of multiple images such as used in multi-modality and multi-spectral imagery.

2. Description of Related Art

Registration between the different bands of multi-spectral imagery, e.g., acquired by an airborne or space sensor, is particularly challenging as the bands that are spectrally far apart do not correlate very well across the image. For example, bands deep in the IR region have both a reflective and an emissive component whereas the bands in the visual region are purely reflective.

Simple phase correlation to obtain the warp is not very effective in these instances. Similarly, registering images acquired using different modalities such as LiDAR, narrow band spectral, and broad band visual photographic imagery present the same issues.

Conventional methods and systems have generally been considered satisfactory for their intended purpose. However, there is still a need in the art for improved image registration for multi-modal and multi-spectral images. The present disclosure provides a solution for this need.

SUMMARY OF THE INVENTION

A method of predicting warps for image registration includes receiving warp data for a first band pair in an N-band system. The method includes fitting a warp model to the warp data to produce an offset profile for the first band pair, predicting a respective offset profile for at least one other band pair in the N-band system, and using the predicted respective offset profile to generate a warp for the at least one other band pair. The method also includes registering images of the at least one other band pair using the warp for the at least one other band pair.

Fitting a warp model to the warp data can include producing a slope profile for the first band pair, wherein the method includes predicting a respective slope profile for the at least one other band pair in the N-band system, and wherein using the predicted offset profile to generate a warp includes using both the predicted offset and slope profiles to generate the warp.

Predicting a respective offset profile can include shifting and scaling the offset profile for the first band pair. Predicting a respective offset profile can include estimating stick spacing for the N-bands of a focal plane array (FPA). Shifting and scaling values of the offset profile for the first band pair can be derived from the stick spacing of the bands in the first band pair and the bands in the at least one other band pair. The shifting and scaling values for predicting the at least one other band pair, d and e, from the first band pair, f and g, can be given as $$\Delta y_{de(fg)} = \frac{y_d + y_e - y_f - y_g}{2},$$

$$r_{de(fg)} = \frac{y_e - y_d}{y_g - y_f},$$

respectively, where $\{y_d, y_e, y_f, y_g\}$ denote spatial locations of bands $\{d, e, f, g\}$ respectively along a y direction in a focal plane array. Predicting a respective offset profile for the at least one other band pair, d and e, can include shifting and scaling the offset profile for the first band pair, f and g.

$$\hat{c}_{de(fg)}(y) = \hat{c}_{fg}(y - \Delta y_{de(fg)}) r_{de(fg)},$$

where $\hat{c}_{fg}(\bullet)$ denotes offset profile estimated for first band pair f and g. Using the predicted respective offset profile to generate a warp for the at least one other band pair includes using a respective optical distortion profile for each respective band pair.

A method of predicting warps for image registration includes receiving warp data for m band pairs in an N-band system, wherein m≤(N−1) and m>1, fitting respective warp models to the warp data for each respective one of the m band pairs to produce respective offset profiles for the m band pairs, predicting m respective offset profiles for at least one band pair in the N-band system, combining all the m predicted offset profiles into a single optimal offset profile for the at least one band pair of the N-band system, using the optimal offset profile to generate a warp for the at least one band pair, and registering images of the at least one band pair using the warp for the at least one band pair.

Using the predicted respective offset profile to generate a warp for the at least one other band pair can include using a respective optical distortion profile for the at least one other band pair. Predicting a respective offset profile can include estimating stick spacing for the N-bands of a focal plane array (FPA). The m offset profiles predicted for the at least one band pair of the N-band system can include an estimation of uncertainty of each prediction. Combining the m predictions into an optimal offset profile can take into account the uncertainty of each prediction. The optimal offset profile predicted can be obtained as a weighted sum of individual m predictions, wherein weights are inversely proportional to respective uncertainty and normalized to sum to one.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
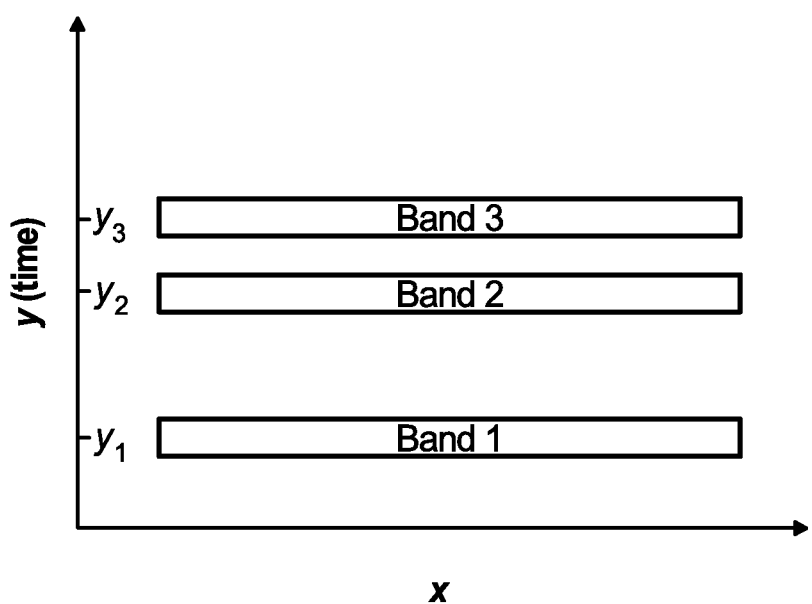
FIG. 1 is a schematic view of an exemplary embodiment of a focal plane array (FPA) constructed in accordance with the present disclosure, showing stick spacing for three different sticks or bands of the FPA.
Figure 2A:
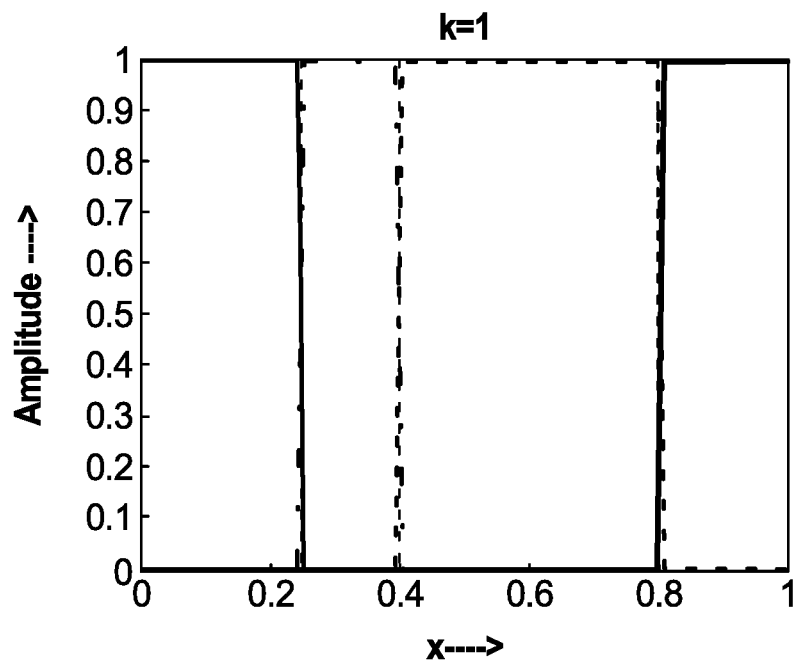
FIGS. 2A-2D are a set of graphs showing spline basis functions in accordance with an exemplary embodiment of the present disclosure.
Figure 2B:
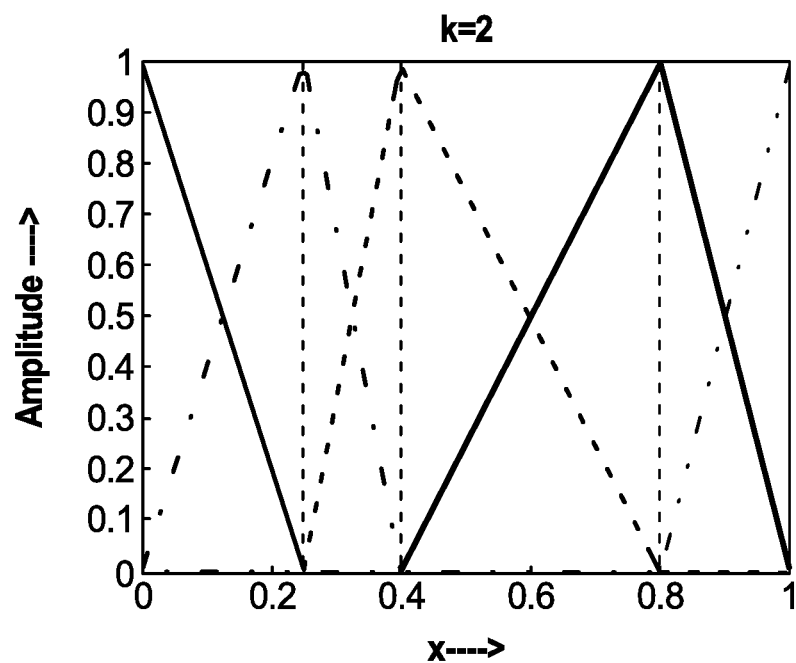
Figure 2C:
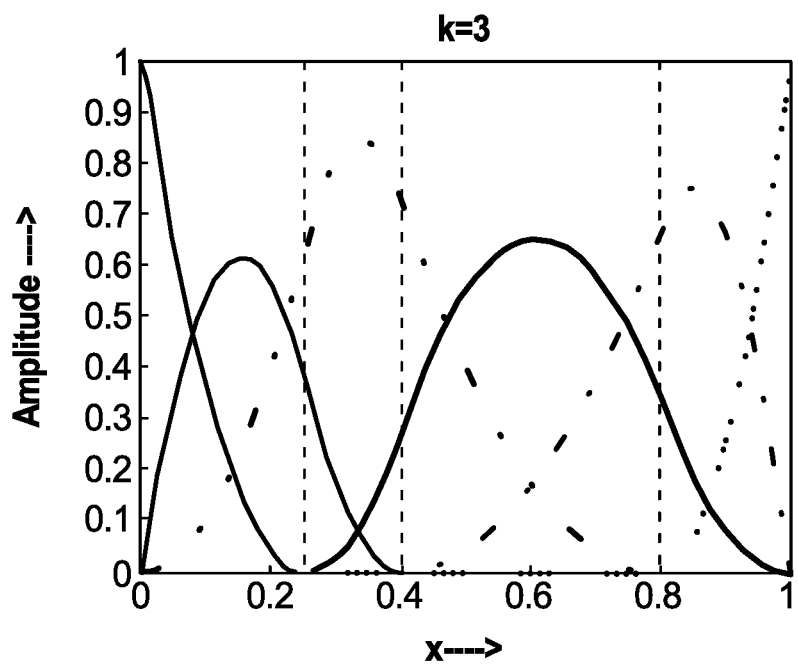
Figure 2D:
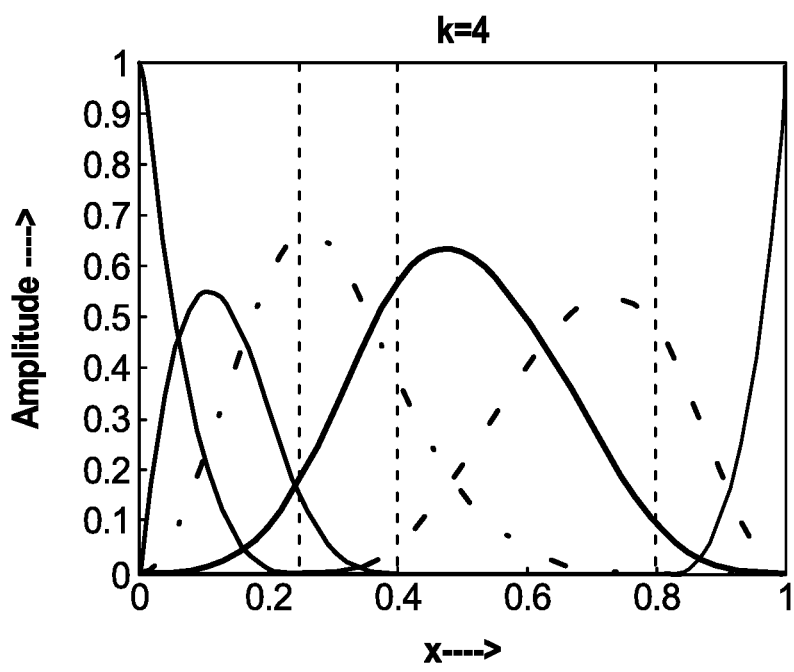

Reference will now be made to the drawings wherein like reference numerals identify similar structural features or aspects of the subject disclosure. For purposes of explanation and illustration, and not limitation, a partial view of an exemplary embodiment of a focal plane array (FPA) in accordance with the disclosure is shown in FIG. 1 and is designated generally by reference character 100. Other embodiments of systems and methods in accordance with the disclosure, or aspects thereof, are provided in FIGS. 2A-6, as will be described. The systems and methods described herein can be used for multi-modal/multi-spectral image registration.

1 Introduction

Push broom scanner systems acquire imagery by scanning the target area using platform motion. The focal plane array (FPA) used to acquire the imagery comprises a series of linear sensor arrays (sticks), one for each spectral band, which are aligned with each other along the length of the array but displaced from each other in the orthogonal direction. FIG. 1 shows an example arrangement of the sticks for a 3 band system. The spacing of the sticks in the y direction may be non-uniform and the alignment in the x direction need not be perfect. The push broom system generally positions the FPA for imaging such that the x direction is more or less perpendicular to the direction of motion of the platform and y aligns with the motion direction. The 2-d imagery of the target area is then acquired by reading out the full length of the sensor sticks at regular time intervals (line time) as the platform moves forward in time. The image for each band is put together 1 line at a time until the scanning stops.

Since the sensor sticks are physically displaced from each other along the y direction, the images for each band are also displaced from each other along the y direction. To fully exploit this multi-spectral data, the images from each of the bands needs to be registered to each other to enable the measurement of the different spectral bands at the same physical location of the target. If the motion of the platform was held constant during the acquisition time, it would be a simple matter of finding a fixed displacement between the band images. In practice however, the platform motion cannot be controlled precisely and both the speed and direction of motion as well as the orientation of the FPA is in a constant state of flux. This variability in motion is more severe for airborne platforms and less variable for spaceborne platforms.

The variable motion introduces a time-varying displacement both in the x and y directions between the different bands and is referred to as a warp between the images. This warp can be estimated by image processing techniques known to people skilled in the art. One method of estimating the warp involves laying down a regular grid of tie-points (spacing determined by the expected variability of the motion) in the reference image and then finding the corresponding tie-point in the other image by correlating the image content in the neighborhood of the tie-point. Such a process is computationally very intensive and can take a significant amount of processing time for large images and highly variable motion, which requires a fine grid spacing for the tie-points. For a N band multi-spectral system, usually one of the bands is deemed as reference and all the other bands are registered to this reference band. This requires N−1 band pairings that need to be correlated increasing the computational burden by a factor of N−1.

Alternatively, the warp may be obtained by employing a model for the imaging system (sensor model) and using it in conjunction with the motion and orientation data of the platform and a measurement of the terrain. However, this method is also very computationally intensive as the models involved are highly non-linear and do not have closed form solutions requiring iterative optimization. The accuracy of estimating the warp in this manner also suffers from not accounting for the height of the man-made objects on top of the terrain and the inherent noise in the measurement of the motion, orientation, and terrain data. In practice, the accuracy of the warp obtained solely from a sensor model is not good enough and people have to revert to image correlation methods as a final step to obtain the desired accuracy.

Another shortcoming of the conventional image correlation methods is that all available information is not leveraged to reduce the noise in the estimated warp. Image correlation treats each pair of bands in isolation when in reality they are all linked together by a common platform motion. In a N band system, there are N(N−1)/2 pairs of bands that can be made and the warp data from all of these band pairings can be optimally combined to obtain a superior warp.

The idea we want to leverage is that the warp between any two bands gives us information about the relative motion of the platform at the time instances the two bands are acquired. We can use the warp data from one or more of the band pairings to populate a model of the platform motion. The relative warp between any other band pairing can then be obtained from the platform motion model. The method can be employed to trade-off computational speed and accuracy of the registration in varying degrees depending on the application requirements. So if computational speed is a concern, we could perform correlation on a single band pair and use it to infer the platform motion. The warps between all the other bands can then be synthesized from the inferred platform motion. If registration accuracy is paramount, then warp data of up to N(N−1)/2 pairs of bands obtained via image correlation may be used to fit the platform motion. The subsequent warp derived from the fitted platform motion is optimal and leverages all available information. In this manner, speed and accuracy can be traded to varying degrees by choosing anywhere between 1 and $N(N-1)/2$ band pairings to compute the raw warp data.

The motion of the platform occurs in a 6 dimensional space, 3 degrees of freedom for position and 3 degrees of freedom for orientation. However, not all of these degrees of freedom can be estimated from the image that is constrained to be on the 2-d surface of the terrain. Furthermore, image correlation between the bands only gives us information about the relative motion between the bands and no information about the absolute positioning of the platform or its orientation. The original motion space is therefore over parameterized for our purposes. The proposed solution has two components: first, a compact representation of the motion that most efficiently encodes the warp between any band pairing, and second, a transformation in this compact parameter space that allows us to compute the warp between any band pairing given the parameters of the some other band pairing. The compact representation of the motion for modeling the warp has another advantage in that it allows us to reduce the noise in the warp estimated by image correlation by utilizing a priori information of the projection geometry.

For the first component of the solution, we propose a separable spline warp model that encodes the relative motion between any band pairing compactly in a 4-d space, which represents a reduction of 2 degrees of freedom from the original motion representation. This is covered in Section 2. Section 3 then covers the parameter transformation of the spline warp model that allows us to predict the warp for any band pairing given the warp parameters for a particular band pairing.

2 Separable Spline Warp Model

In this Section, we formulate a model for the warp between a pair of bands. One of the bands will be designated as the reference band and the other band will be designated as the warped band. In the interest of simplifying notation, we omit the particular band numbers for which the warp is being computed as the treatment remains the same for any band pairing.

Let $\{x_w, y_w\}$ denote the coordinates in the warped band that correspond to the coordinates $\{x, y\}$ in the reference band. Let $$d_x(x,y) = x_w(x,y) - x \quad (1)$$

$$d_y(x,y) = y_w(x,y) - y \quad (2)$$

denote the space varying displacement (warp) between the warped and the reference band. We assume the images of the reference and warped bands are acquired by two sensor sticks displaced from each other spatially in the y direction. The sensor sticks are mounted on a moving platform and the images are obtained by scanning the sticks in time as the platform moves. The platform motion may not be perfectly uniform in time and this causes a time-dependent warping between the bands. Given the rigid geometry in the x direction (fast-scan), we expect the warping to be linear in this direction unless there is uncorrected optical distortion. The linear warping in x will be time dependent but the optical distortion will be constant in time.

Let $s_x(\bullet)$ and $c_x(\bullet)$ denote the slope and offset as a function of time for the linear mapping of the warp in the x component. Similarly, let $s_y(\bullet)$ and $c_y(\bullet)$ denote the slope and offset for the y component of the warp in time. Let $o_x(\bullet)$ and $o_y(\bullet)$ denote the relative optical distortion between the warped and the reference band along the sensor array for the x and y component respectively. We model the space varying translation between the bands as follows $$d_x(x,y) = s_x(y)x + c_x(y) + o_x(x)$$

$$d_y(x,y) = s_y(y)x + c_y(y) + o_y(x). \quad (3)$$

Note that this is nothing but a Taylor series expansion of the warp $d(x, y)$ along the x direction with the zeroth and first order coefficients as functions of y (time) and the higher order coefficients constant in time.

In the subsequent treatment, we will use $v = \{x, y\}$ as an index for x or y. Since the equations are similar for the translations in x and Y, this makes for compact notation. Assuming the platform motion is more or less steady, the slope and offset, $s_v(\bullet)$ and $c_v(\bullet)$, will be smooth functions of time, y. We choose to model them as B-splines and they can written as a summation of a set of basis functions as $$s_v(y) = \sum_{j=1}^{n_s} s_{vj} B_{j,k}^s(y), \quad (4)$$

$$c_v(y) = \sum_{j=1}^{n_c} c_{vj} B_{j,k}^c(y), \quad (5)$$

where $n_s$ and $n_c$ are the number of basis functions that are chosen for the slope and offset functions respectively. The number of knots and the spline order k determines the number of basis functions. See Sec. 2.1 for generating the set of basis functions $B_{j,k}(\bullet)$, $j=1, \ldots, n$ given the order and knot locations.

The optical distortion can either be modeled as a B-spline or a polynomial $$o_v(x) = \sum_{j=1}^{n_o} o_{vj} B_{j,k}^o(x) \text{ or } o_v(x) = \sum_{j=1}^{n_o} o_{vj} x^{e_j}, \quad (6)$$

where $n_o$ denotes the number of basis functions and $e_j$, $j=1, \ldots, n_o$, denotes the $n_o$ exponents chosen for the polynomial basis. In the subsequent treatment, we will use $B_{j,k}^o(\bullet)$ to denote either for the spline basis or the polynomial basis.

2.1 Recursive Generation of B-Spline Basis Functions

To generate the B-spline functions, the number and location of the knots need to be specified along with the order of the spline. Let the knots sequence be denoted as $t_1 \le t_2 \le \ldots \le t_n$, where n is the number of knots. Let k denote the order of the spline where $k=1$ denotes the $0^{th}$ order spline. The B-spline basis functions for any order k is generated recursively from the previous order basis functions. The knots sequence is augmented for each order k as follows $$t^{(k)} = \{\underbrace{t_1, \ldots, t_1}_{k \text{ times}}, t_2, \ldots, t_{n-1}, \underbrace{t_n, \ldots, t_n}_{k \text{ times}}\}. \quad (7)$$

The recursion of the B-spline at any order $k>1$ is given as $$B_{j,k}(x) = \frac{x - t_j^{(k)}}{t_{j+k-1}^{(k)} - t_j^{(k)}} B_{j-1,k-1}(x) + \frac{t_{j+k}^{(k)} - x}{t_{j+k}^{(k)} - t_{j+1}^{(k)}} B_{j,k-1}(x), \quad (8)$$

$$j = 1, \ldots, n+k-2, k > 1,$$

and is initialized at k=1 as $$B_{j,1}(x) = \begin{cases} 1 & t_j \le x < t_{j+1}, j = 1, \ldots, n-2 \\ 1 & t_j \le x \le t_{j+1}, j = n-1 \\ 0 & \text{otherwise} \end{cases} \quad (9)$$

FIGS. 2A-2D show the spline basis functions starting at k=1 and ending at k=4 to obtain the cubic spline. The knots are non-uniformly spaced at [0, 0.25, 0.4, 0.8, 1] and are shown as black dotted lines.

2.2 Warping Model Parameter Estimation

The unknown spline coefficients for slope, offset, and optical distortion need to estimated. This is achieved by fitting the warping model Eq. (3) to the warping data obtained by the image correlation algorithm at a discrete set of tie points. Let $\{x_i, y_i\}$, i=1, . . . , m denote a set of m grid points at which the warp has been estimated. To facilitate the estimation of the unknown coefficient, we rewrite Eq. (3) in vector-matrix notation $$d = Ap, \quad (10)$$
where $$A = \begin{bmatrix} B^s_{1,k}(y_1)x_1 & \ldots & B^s_{n_s,k}(y_1)x_1 & B^c_{1,k}(y_1) & \ldots & B^c_{n_c,k}(y_1) & B^o_{1,k}(x_1) & \ldots & B^o_{n_o,k}(x_1) \\ \vdots & \ddots & \vdots & \vdots & \ddots & \vdots & \vdots & \ddots & \vdots \\ B^s_{1,k}(y_m)x_m & \ldots & B^s_{n_s,k}(y_m)x_m & B^c_{1,k}(y_m) & \ldots & B^c_{n_c,k}(y_m) & B^o_{1,k}(x_1) & \ldots & B^o_{n_o,k}(x_,) \end{bmatrix} \quad (11)$$

is a $m \times n_p$ matrix, where $n_p = n_s + n_c + n_o$, and $$p = \begin{bmatrix} s_{x1} & s_{y1} \\ \vdots & \vdots \\ s_{xn_s} & s_{yn_s} \\ c_{x1} & c_{y1} \\ \vdots & \vdots \\ c_{xn_c} & c_{yn_c} \\ o_{x1} & o_{y1} \\ \vdots & \vdots \\ o_{xn_o} & o_{yn_o} \end{bmatrix}, \quad d = \begin{bmatrix} d_x(x_1, y_1) & d_y(x_1, y_1) \\ \vdots & \vdots \\ d_x(x_m, y_m) & d_y(x_m, y_m) \end{bmatrix}, \quad (12)$$

are $n_p \times 2$ and $m \times 2$ matrices respectively. The matrix P has all the spline coefficients, the matrix d has all the data, and the matrix A is constructed based on the model structure. The spline basis functions have a compact local support and this makes the matrix A to be sparse. Note that bold case letters will be used to represent matrices. Subscripts on matrices will be used to identify rows (first index) and columns (second index) with * denoting all indices. For example, $A_{i*}$ denotes the $i^{th}$ row and $A_{*j}$ denotes the $j^{th}$ column of matrix A. The first and second columns of p and d matrices contain the model coefficients and data for x and y respectively. Hence we will also use $p_{*v}$ or $d_{*v}$ with v taking values $\{x,y\}$ to denote the column vectors corresponding to x and Y.

2.2.1 Least Squares Estimation of Spline Coefficients

Equation (10) compactly represents the warp model evaluated at the tie point grid where warping data is available either through image registration or some other means. In general, there will be noise in the data either due to measurement process or model mismatch. We would like to adjust the unknown spline coefficient to minimize the mean square error between the model predictions and the data. The least-squares estimate can be obtained in closed form and is given as $$\hat{p} = (A^t A)^{-1} A^t d. \quad (13)$$

Note that the ^ notation indicates that the underlying quantity has been estimated.

2.2.2 Weighted Least Squares Estimation of Spline Coefficients

The solution of Eq. (13) assumes that the noise is uniformly distributed across all the m data points and that the two components in x and y are independent. However, depending on how the data values are obtained for the warping, the noise may be quite variable between the data points and also coupled between the two components. Let W(i) denote the 2×2 weighting matrix for data point i based on the confidence we have on the estimate for that point. The inverse of the noise covariance matrix can be chosen as the weighting matrix. The weighted mean square error across all m data points in vector-matrix notation is given as $$C = \sum_{i=1}^{m} (A(i)\vec{p} - d^t_{i*})^t W(i)(A(i)\vec{p} - d^t_{i*}), \quad (14)$$
where $$A(i) = \begin{bmatrix} A_{i*} & 0 \\ 0 & A_{i*} \end{bmatrix} \quad (15)$$

is a $2 \times 2n_p$ matrix and $$\vec{p} = \begin{bmatrix} p_{*x} \\ p_{*y} \end{bmatrix} \quad (16)$$

is a $2n_p \times 1$ vector containing the spline coefficient for both components. The spline coefficients that minimize the mean square error C is obtained by differentiating Eq. (14) with respect to $\vec{p}$ and setting it equal to zero $$\left. \frac{\partial C}{\partial \vec{p}} \right|_{\vec{p}=\hat{\vec{p}}} = 0 \quad (17)$$

$$\sum_{i=1}^{m} 2A^t(i) W(i) \left( A(i)\hat{\vec{p}} - d^t_{i*} \right) = 0$$

$$\sum_{i=1}^{m} A^t(i) W(i) A(i)\hat{\vec{p}} = \sum_{i=1}^{m} A^t(i) W(i) d^t_{i*}$$

$$\hat{\vec{p}} = \left( \sum_{i=1}^{m} A^t(i) W(i) A(i) \right)^{-1} \left( \sum_{i=1}^{m} A^t(i) W(i) d^t_{i*} \right)$$

2.2.3 Special Case for Uncorrelated Components

If the x and y components are uncorrelated (weighting matrices W(i) are diagonal), then Eq. (17) can be simplified since the spline coefficient for x and y can be estimated independently. Let $$W_x = \begin{bmatrix} W_{11}^{(1)} & & 0 \\ & \ddots & \\ 0 & & W_{11}^{(m)} \end{bmatrix}, W_y = \begin{bmatrix} W_{22}^{(1)} & & 0 \\ & \ddots & \\ 0 & & W_{22}^{(m)} \end{bmatrix} \quad (18)$$

be the m×m diagonal weighting matrices for x and y components respectively. Then the weighted least-squares solution for the two components is given as $$\hat{p}_{*_v} = (A^t W_v A)^{-1} A^t W_v d_{*_v}, v = \{x, y\} \quad (19)$$

Note that until now we have assumed the basis functions are the same for x and y components. This restriction can be easily relaxed by using a different matrix A for the x and y components. For the coupled solution given by Eq. (17), the matrix A(i) can be modified as $$A(i) = \begin{bmatrix} A_{x_{i^*}} & 0 \\ 0 & A_{y_{i^*}} \end{bmatrix} \quad (20)$$

where $A_x$ and $A_y$ denotes the A matrix formed from the basis functions for x and y respectively.

2.2.4 Numerical Computation Considerations

The warping model matrix A can end up being badly scaled and ill-conditioned leading to a host of numerical issues in the solution of the model spline coefficients. The problem arises because the range of x and y may be large and quite different from each other. The large range of x makes the basis functions for the optical distortion model given by Eq. (6) to have a very large dynamic range if the polynomial model is chosen. With finite precision, the matrices will become rank deficient making it difficult to fit the data correctly. To overcome this problem, it is advisable to first normalize the range of the x and y between 0 and 1. The warping model is then fitted in the normalized domain and the results scaled back to the original domain for subsequent processing.

Also note the solutions in Eqs. (13), (17), and (19), require a matrix inverse. Although they have been written in that form, it is not advisable to compute the explicit inverse both from a numerical accuracy perspective nor performance considerations. Instead, it is better to take the inverted matrix to the other side of the equation and solve the resulting set of linear equations using Gaussian elimination.

2.3 Warp Model Evaluation

Once the spline coefficients are estimated using eqs. (13) or (17) or (19), the slope, offset, and optical distortion profiles can be computed using eqs. (4), (5), and (6), as $$\hat{s}_v(y) = \sum_{j=1}^{n_s} \hat{s}_{vj} B_{j,k}^s(y), \quad (21)$$

$$\hat{c}_v(y) = \sum_{j=1}^{n_c} \hat{c}_{vj} B_{j,k}^c(y), \quad (22)$$

$$\hat{o}_v(x) = \sum_{j=1}^{n_o} \hat{o}_{vj} B_{j,k}^o(x), \quad (23)$$

The estimated warp can then be evaluated at any spatial location (x, y) in the image as $$\hat{d}_v(x,y) = \hat{s}_v(y)x + \hat{c}_v(y) + \hat{o}_v(x) \quad (24)$$

To produce a de-warped band that is registered to the reference band, an image resampling routine will evaluate the warp using eq. (24) at each pixel location of the reference image to determine the location of the corresponding pixel in the warped band and then use the interpolated pixel value of the warped band at this location to fill in the values for the de-warped band at the reference pixel location.

2.4 Uncertainty of the Slope and Offset Profiles

The covariance matrix (uncertainty) of the parameter vector $\hat{p}_{*_v}$ including the slope, offset, and optical distortion, spline coefficients for the case of uncorrelated x and y components can be computed as $$\hat{\Sigma}_v = (A^t W_v A)^{-1}. \quad (25)$$

Note that the spline and offset coefficients covariance matrices are contained as sub-matrices of $\hat{\Sigma}_v$. The covariance of the slope spline coefficients is given as $$\hat{\Sigma}_{sv} = \hat{\Sigma}_{v1:n_s, 1:n_s}, \quad (26)$$

where we have used the colon notation in the subscript to denote the range of row and column indices to extract from the overall covariance. So for example, the subscript notation in eq. (26) means that the matrix spanning rows indices $\{1, \ldots, n_s\}$ and column indices $\{1, \ldots, n_s\}$ within the matrix $\hat{\Sigma}_v$ is extracted. Similarly, the covariance of the offset spline coefficients is given as $$\hat{\Sigma}_{cv} = \hat{\Sigma}_{vn_s+1:n_s+n_c, n_s+1:n_s+n_c}. \quad (27)$$

The variance (uncertainty) of the slope profile at a particular time instance y is given as $$\hat{\sigma}_{sv}^2(y) = B_s(y)\hat{\Sigma}_{sv} B_s^t(y) \quad (28)$$

where $$B_s(y) = [B_{1,k}^s(y) \ldots B_{n_s,k}^s(y)] \quad (29)$$

A similar expression applies for the offset profile $$\hat{\sigma}_{cv}^2(y) = B_c(y)\hat{\Sigma}_{cv} B_c^t(y) \quad (30)$$

where $$B_c(y) = [B_{1,k}^c(y) \ldots B_{n_c,k}^c k(y).] \quad (31)$$

3 Warp Model Parameter Transformation Between Band Pairings

In this Section, we derive a transformation between the slope and offset profiles obtained from one pair of bands to another pair of bands. This will allow us to predict the slope and offset profiles for an arbitrary pairing of bands given the slope and offset profiles for a particular band pairing. For notational simplicity, we will omit the subscripts associated with the x and y component as the expressions are the same for both of them. The transformation for the slope and offset profile is also similar so all the equations below are written only for the slope profile. The expressions for the offset profile can be obtained by simply substituting c for s in the expressions, i.e., this substitution explains how to obtain the corresponding expressions of the offset profile from the expressions of the slope profile.

Since we are transforming from one band pairing to another, we will need to explicitly specify the bands that are being used in the notation. So all the quantities derived in previous Sections will have a subscript denoting the band pairing used to estimate them. For example, $\hat{s}_{fg}(\bullet)$ denotes the slope profile estimated for the warp between bands f and g using image correlation data as given by eq. (21). When we predict the slope profile for a new pair of bands d and e using the slope profile estimated from bands f and g, we will use the subscript notation $\hat{s}_{de(fg)}(\bullet)$.

The slope and offset profiles encode the relative motion at the time instances the two bands are measured. In this sense, they are derivatives of the platform motion profile. So the slope and offset profiles should just scale by the ratio of the time difference between the two band pairings. The profiles will also be shifted in time between the two band pairings. The shift will be equal to the time difference between the time spacing of the two band pairings. Taking these two factors into account, the predicted slope profile of band pairing {d,e} from the slope profile estimated for band pairing {f, g} given as $$\hat{s}_{de(fg)}(y) = \hat{s}_{fg}(y - \Delta y_{de(fg)}) r_{de(fg)}, \quad (32)$$

where the time shift is $$\Delta y_{de(fg)} = \frac{y_d + y_e - y_f - y_g}{2}, \quad (33)$$

and the scaling is $$r_{de(fg)} = \frac{y_e - y_d}{y_g - y_f}, \quad (34)$$

and $\{y_d, y_e, y_f, y_g\}$ denote the spatial locations of the bands {d, e, f, g} respectively along the Y direction in the FPA (example shown in FIG. 1). The uncertainty of the predicted slope profile is given as $$\hat{\sigma}_{de(fg)}^2(y) = \hat{\sigma}_{fg}^2(y - \Delta y_{de(fg)}) r_{de(fg)}^2, \quad (35)$$

where $\hat{\sigma}_{fg}^2(\bullet)$ denotes the variance of the slope profile for band pairing {f,g} estimated from image correlation data as given by eq. (28).

3.1 Optimal Estimation of Slope and Offset Profile from Multiple Predictions

If image correlation is performed between multiple band pairings to improve the registration performance, we will have multiple predictions of the slope and offset profile for each band pairing. These predictions can be optimally combined given the uncertainty associated with each prediction to obtain an optimal estimate of the profile, which combines the information from all the available data.

There are N(N−1)/2 band pairs in a N band system and we can choose to do image correlation between any of those combinations. Let M be the number of band pairs chosen for image correlation. Let P be the set of all band pairs on which image correlation is performed. Then the optimal estimate of the slope profile for a particular band pair {d,e} is obtained as weighted sum of all the individual M predictions $$\bar{s}_{de}(y) = \left( \sum_{\{f,g\} \in P} \hat{\sigma}_{de(fg)}^{-2}(y) \right)^{-1} \sum_{\{f,g\} \in P} \hat{\sigma}_{de(fg)}^{-2}(y) \hat{s}_{de(fg)}(y), \quad (36)$$

where the uncertainty associated with each prediction is used as weight and we have used the ⁻ notation to denote the optimal smoothing and distinguish it from the estimated quantities.

To illustrate this process, we will use the example of a 3 band system as shown in FIG. 1. In this case, we perform 3 image correlations between band pairs {1,2}, {1,3}, and {2,3}. From the image correlation warp data, we obtain slope profiles for the 3 band pairs $\hat{s}_{12}(\bullet)$, $\hat{s}_{13}(\bullet)$, and $\hat{s}_{23}(\bullet)$ along with their associated uncertainty as covered in Sec. 2. Now if we consider a particular band pair, e.g. {1,3}, we can obtain 3 independent estimates of the slope profiles $\hat{s}_{13(12)}(\bullet)$, $\hat{s}_{13(13)}(\bullet)$, and $\hat{s}_{13(23)}(\bullet)$ and their associated uncertainty using eqs. (32) and (35). Note that $\hat{s}_{13(13)}(\bullet) = \hat{s}_{13}(\bullet)$. The final optimal estimate of the slope profile for band pair {1,3} is given as $$\bar{s}_{13}(y) = \frac{\hat{\sigma}_{13}^{-2}(y)\hat{s}_{13}(y) + \hat{\sigma}_{13(23)}^{-2}(y)\hat{s}_{13(23)}(y) + \hat{\sigma}_{13(12)}^{-2}(y)\hat{s}_{13(12)}(y)}{\hat{\sigma}_{13}^{-2}(y) + \hat{\sigma}_{13(23)}^{-2}(y) + \hat{\sigma}_{13(12)}^{-2}(y)} \quad (37)$$

4 Different Configurations for Warp Estimation

Figure 3:
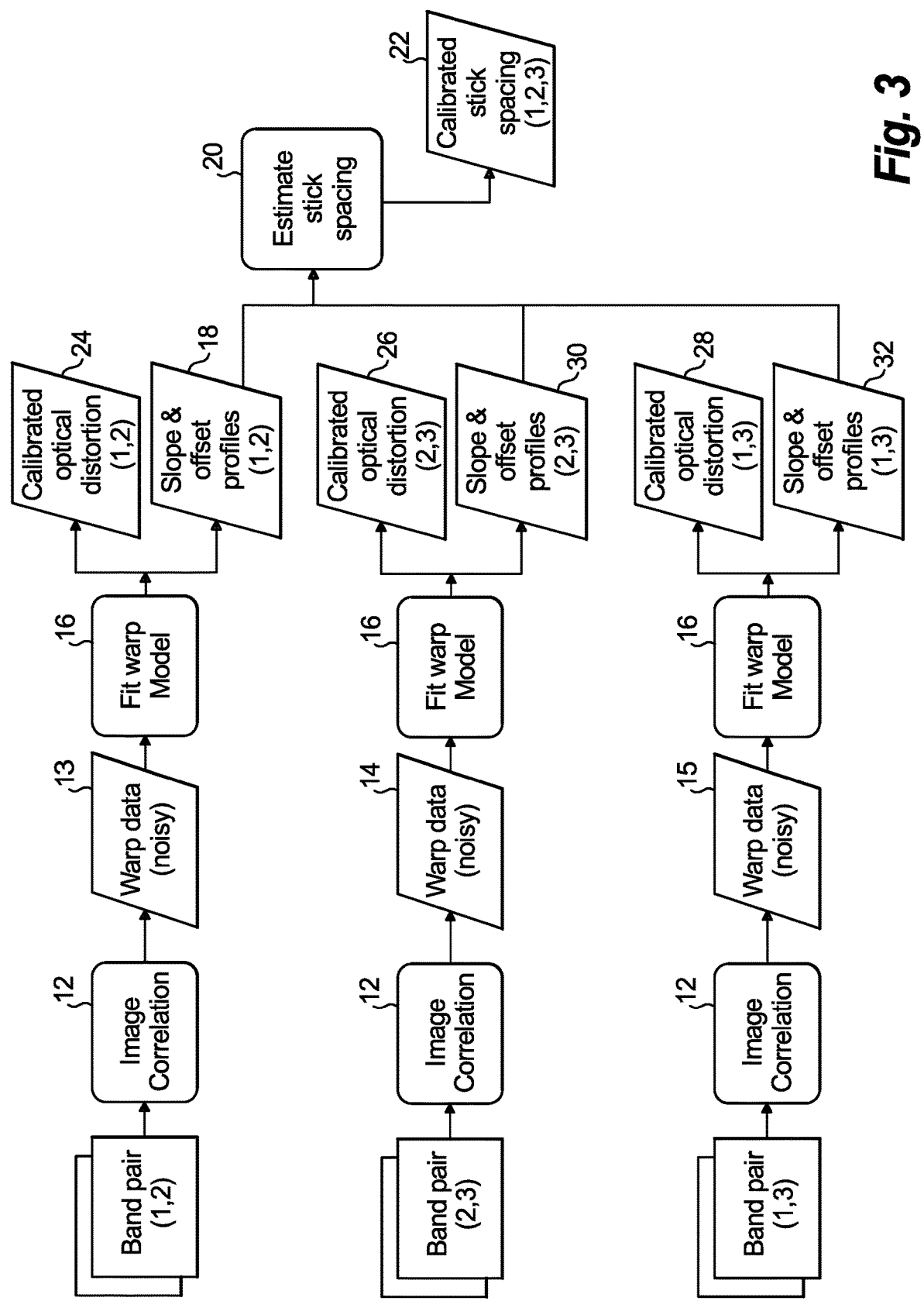
FIG. 3 is a data flow diagram of an exemplary embodiment of a method for generating calibration parameters in accordance with the present disclosure.

To enable the algorithm to be able to generate a warp for any band pairing from data for a limited set of band pairs, it first needs to be calibrated. This calibration is performed offline using a set of images that have been acquired for calibration purposes and need be done only once for a particular scanner system. It requires image correlation between all sets of band pairs to learn the model parameters that do not vary with time. FIG. 3 shows the data flow during calibration for a 3 band system. The 3 sets of band pairs {1,2}, {2,3}, and {1,3}, are correlated 12 to generate warp data 13, 14, 15, respectively. This data will generally be noisy especially in areas where there is little edge information in the image to correlate against. The noisy warp data is then fitted using the warp model 16 and the slope, offset, and optical distortion profiles 18, 30, 32, 24, 26, and 28 are generated. This is described above in Sec. 2. The optical distortion profiles 24, 26, and 28 between the band pairs are static and stored for future use. The slope and offset profiles 18, 30, and 32 should be scaled and shifted versions of one another as seen in eq. (32). By correlating these profiles against one another, the time shift between them can be estimated. The time shift is a function of the stick spacing as seen in eq. (33). Using the 3 time shifts, the 3 stick positions 22 $\{y_1, y_2, y_3\}$ can be estimated 20. Note that we can only solve for the relative spacing between the sticks so $y_1$ can be set to zero without loss of generality and the other stick positions $\{y_2, y_3\}$ can be solved for in a least squares sense from the 3 time shift measurements.

Figure 4:
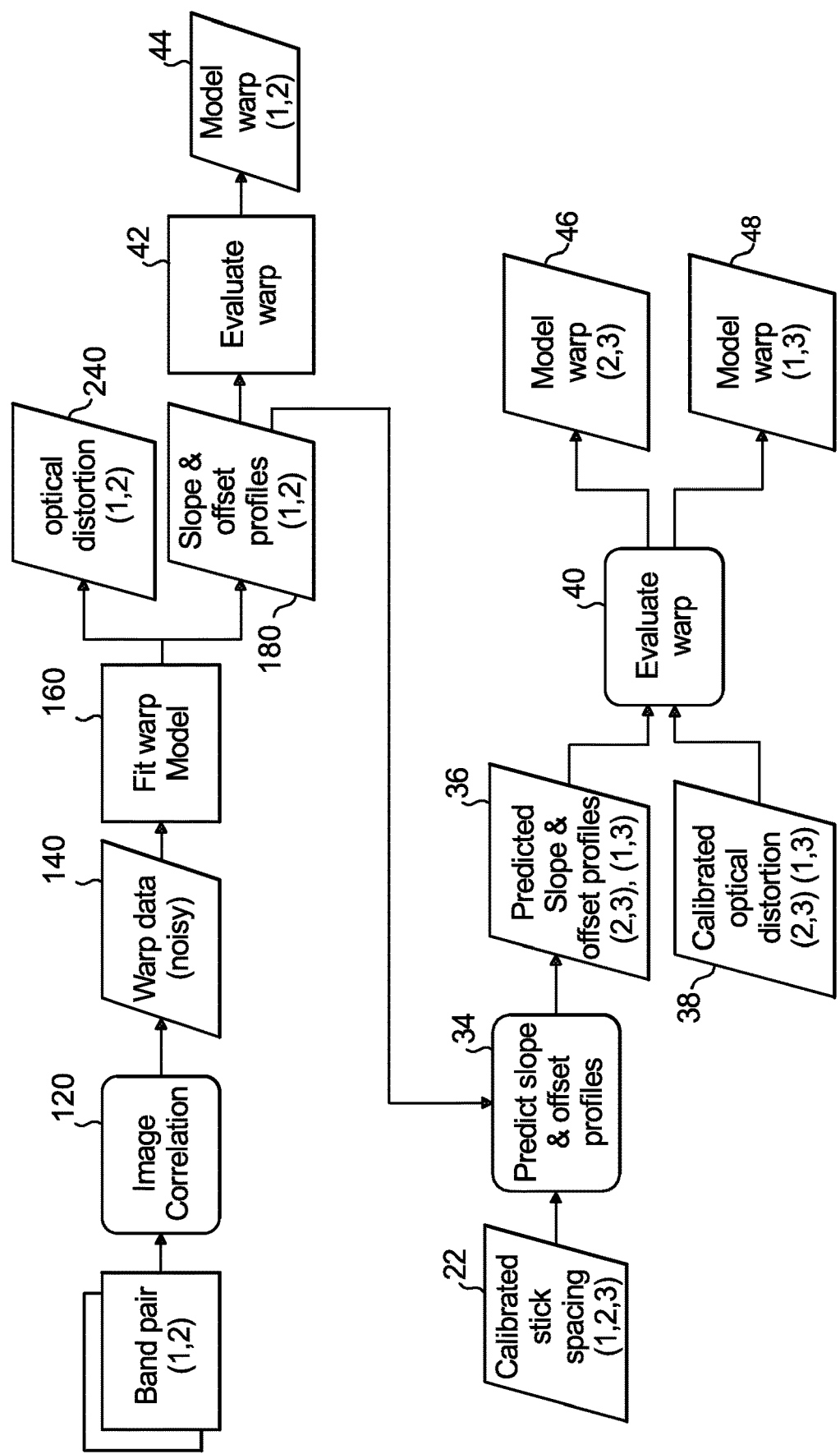
FIG. 4 is a data flow diagram of an exemplary embodiment of a method of predicting warp for all band pairings using image correlation data from a single band pair in accordance with the present disclosure.

FIG. 4 shows the on-line data flow for computing the warps between all pairs of a 3 band system using data from just a single image correlation. This configuration would be used if computational speed is very important and reduced accuracy can be tolerated. Note that the process for FIG. 4 is run every time a new image is acquired (on-line) whereas the process for FIG. 3 need run only once (off-line) on a previously collected image data set to estimate the calibration parameters subsequently used in the on-line process. In this case, band pair {1,2} of the acquired image is fed to the image correlation routine 120 to generate the noisy warp data 140. The warp model 160 is fitted to this data to generate the slope, offset, and optical distortion profiles 180 and 240. The profiles can then be used in eq. (24) to generate 42 the warp 44 at any location for band pair {1,2}. The slope and offset profiles 180 from band pair {1,2} are used to predict 34 the slope and offset profiles 36 for band pairs {2,3} and {1,3} using the calibrated stick spacing 22, shown in FIG. 3. Equation (32) is used to do the prediction. The predicted slope and offset profiles 36 along with the calibrated optical distortion profiles 38, i.e. calibrated optical distortions 26 and 28 from FIG. 3, are then used to compute 40, using eq. (24), the warps 46 and 48 for band pairs {2,3} and {1,3}, respectively, at any location.

Figure 5:
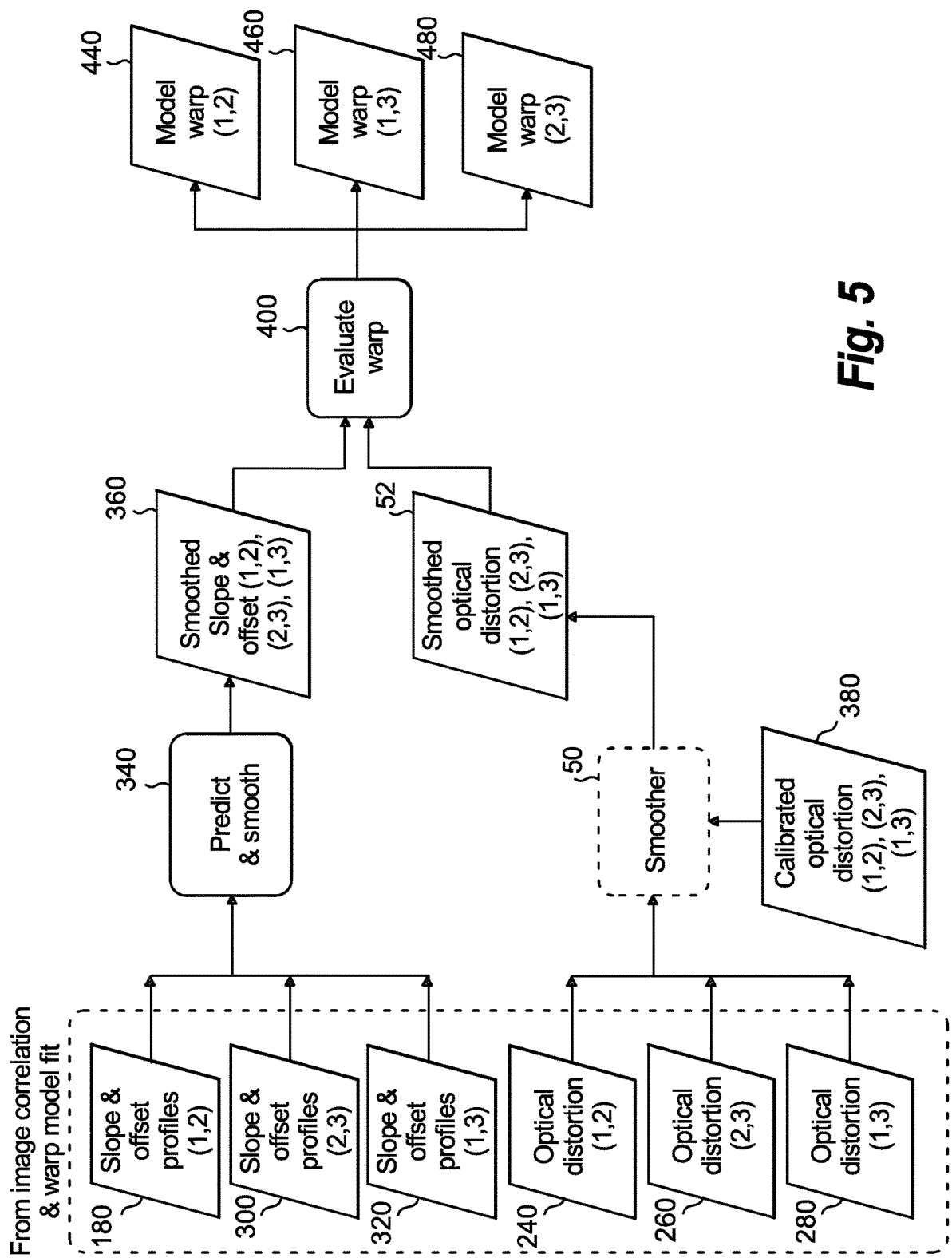
FIG. 5 is a data flow diagram of an exemplary embodiment of a method of generating warp, e.g., optimal warp, using image correlation data from all band pairs in accordance with the present disclosure.

FIG. 5 shows the data flow for computing the warps 44, 46, and 48 between all pairs of a 3 band system by leveraging all available information. In this case, the image correlation is done between all band pairs and this data is used to optimally predict the parameters of the warp model. This configuration would be used if accuracy is important and computational speed is of secondary consideration. Similarly to FIG. 4, this is an on-line process that is performed every time a new image is acquired. The slope, offset, and optical distortion profiles 180, 300, 320, 240, 260, and 280 are first estimated by fitting the warp model 16 to the data generated by the image correlation process 12 for each band pair ({1,2}, {2,3}, and {1,3}), of the acquired image. The estimation process is the same as shown in FIG. 3 but it is performed on the newly acquired image. All of the 3 slope and offset profiles 180, 300, and 320 are used to predict 340 slope and offset profile for each band pair using eq. (32). This provides 3 predictions for each band pair, which are optimally combined using eq. (36) to produce a single smoothed estimate 360 of the slope and offset.

Figure 6:
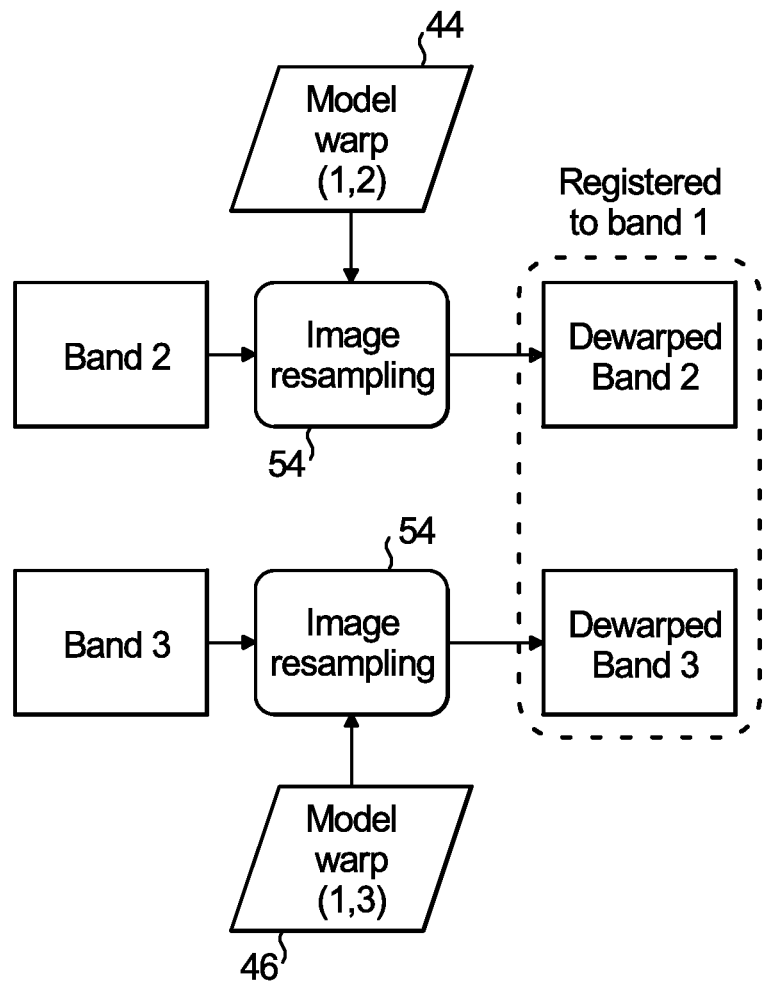
FIG. 6 is a data flow diagram of an exemplary embodiment of a method of generating registered bands to a reference image from pairwise warps generated by the exemplary embodiments of FIG. 4 or 5.

The optical distortion profiles 240, 260, and 280 for each band pair may also optionally be smoothed 50 using the calibrated optical distortion profile 380 (a collection of calibrated optical distortions 24, 26, and 28 from FIG. 3) for each respective band pair. In the final step, the smoothed slope and offset profiles 360 along with the (smoothed) optical distortion profile 52 for each band pair is used to evaluate 400 the warp 440, 460 and 480 for that band pair. FIG. 6 shows the data flow for a registration application that uses the generated warps for the example 3 band system. In this case, band 1 is considered as the reference band and the warped bands 2 and 3 are resampled 54 using the warps between band pairs {1,2} and {1,3} respectively. The dewarped bands 2 and 3 are now spatially registered to the reference band 1.

Although we have described the various applications of the proposed method for an example 3 band system, those skilled in the art will now appreciate how to apply these methods to a N band system. Furthermore, the two applications that have been illustrated are at the two extremes of the computational speed versus accuracy trade-off spectrum. It is straightforward to trade-off speed and accuracy to a different amount for a N band system by either increasing or decreasing the number of image correlations that are performed.

Those skilled in the art will readily appreciate that a system for registering images can include a module configured to implement machine readable instructions to perform one or more of the method embodiments described above.

As will be appreciated by those skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks The methods and systems of the present disclosure, as described above and shown in the drawings, provide for imagery with superior properties including improved multi-band/multi-spectral image registration. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of predicting warps for image registration comprising:
   receiving warp data for a first band pair in an N-band system;
   fitting a warp model to the warp data to produce an offset profile for the first band pair;
   predicting a respective offset profile for at least one other band pair in the N-band system;
   using the predicted respective offset profile to generate a warp for the at least one other band pair; and
   registering images of the at least one other band pair using the warp for the at least one other band pair, wherein predicting a respective offset profile includes shifting and scaling the offset profile for the first band pair, wherein predicting a respective offset profile includes estimating stick spacing for the N-bands of a focal plane array (FPA), wherein shifting and scaling values of the offset profile for the first band pair are derived from the stick spacing of the bands in the first band pair and the bands in the at least one other band pair, wherein the shifting and scaling values for predicting the at least one other band pair, d and e, from the first band pair, f and g, are given as $$\Delta y_{de(fg)} = \frac{y_d + y_e - y_f - y_g}{2},$$

$$r_{de(fg)} = \frac{y_e - y_d}{y_g - y_f},$$

respectively, where $\{y_d, y_e, y_f, y_g\}$ denote spatial locations of bands $\{d, e, f, g\}$ respectively along a y direction in a focal plane array.

2. A method as recited in claim 1, wherein predicting a respective offset profile for the at least one other band pair, d and e, includes shifting and scaling the offset profile for the first band pair, f and g $$\hat{c}_{de(fg)}(y) = \hat{c}_{fg}(y - \Delta y_{de(fg)}) r_{de(fg)},$$

where $\hat{c}_{fg}(\bullet)$ denotes offset profile estimated for first band pair fg and g.

3. A method as recited in claim 1, wherein using the predicted respective offset profile to generate a warp for the at least one other band pair includes using a respective optical distortion profile for each respective band pair.

* * * * *